(12) United States Patent
Pedersen (10) Patent No.: US 8,265,099 B2
(45) Date of Patent: Sep. 11, 2012

(54) ERROR CORRECTION SCHEME IN A HEARING SYSTEM WIRELESS NETWORK

(75) Inventor: Brian Dam Pedersen, Ringsted (DK)

(73) Assignee: GN ReSound A/S, Ballerup (DK)

( * ) Notice: Subject to any disclaimer, the term of this patent is extended or adjusted under 35 U.S.C. 154(b) by 229 days.

(21) Appl. No.: 12/353,192

(22) Filed: Jan. 13, 2009

(65) Prior Publication Data

US 2010/0157790 A1    Jun. 24, 2010

(30) Foreign Application Priority Data

Dec. 22, 2008   (DK) .................................. 2008 01830

(51) Int. Cl.
*H04R 25/00* (2006.01)
(52) U.S. Cl. .......................... 370/498; 714/746; 714/799
(58) Field of Classification Search .................. 370/230, 370/498; 714/715–805
See application file for complete search history.

(56) References Cited

U.S. PATENT DOCUMENTS

| | | | | |
|---|---|---|---|---|
| 5,182,749 A * | 1/1993 | Kazecki et al. | ............... | 370/498 |
| 5,974,584 A * | 10/1999 | Hendrickson et al. | ........ | 714/800 |
| 6,243,846 B1 * | 6/2001 | Schuster et al. | ............... | 714/776 |
| 6,473,875 B1 * | 10/2002 | Anderson | ...................... | 714/746 |
| 7,617,434 B1 * | 11/2009 | Huang | ............................ | 714/755 |
| 2002/0080802 A1 * | 6/2002 | Sachs et al. | .................... | 370/401 |
| 2003/0045283 A1 | 3/2003 | Hagedoorn | | |
| 2004/0243913 A1 * | 12/2004 | Budge et al. | ................... | 714/776 |
| 2006/0274747 A1 * | 12/2006 | Duchscher et al. | ........... | 370/389 |
| 2007/0165673 A1 | 7/2007 | Huang | | |
| 2007/0230714 A1 * | 10/2007 | Armstrong | ...................... | 381/74 |
| 2008/0031478 A1 | 2/2008 | Alber et al. | | |
| 2008/0052605 A1 * | 2/2008 | Luo et al. | ....................... | 714/776 |

(Continued)

FOREIGN PATENT DOCUMENTS

JP    2004159042 A    6/2004

(Continued)

OTHER PUBLICATIONS

Cheng, Wenqing et al., Hybrid Solution: A FEC Algoritm for Fault Tolerant Routing in Sensor Netorks, 1st International Conference on Communications and Networking in China, 2006. ("ChinaCom '06"), pp. 1-5 (Apr. 10, 2007).*

(Continued)

*Primary Examiner* — Kibrom T Hailu
*Assistant Examiner* — Benjamin Lamont
(74) *Attorney, Agent, or Firm* — Vista IP Law Group, LLP (57) ABSTRACT

A method of wireless data communication between a hearing instrument and another device, includes receiving N data packages $A_1, A_2, \ldots, A_N$, wherein the N data packages are obtained by dividing a data package D, receiving data package C, wherein the data package C is formed as a function of $A_1, A_2, \ldots, A_N$ in accordance with a relationship $C=F(A_1, A_2, \ldots, A_N)$, performing error detection, and recovering $A_E$, one of the data packages $A_1, A_2, \ldots, A_N$ that contains an error, in accordance with a relationship $A_E = R(A_1, A_2, \ldots, C, \ldots, A_N)$, in which $A_1, A_2, \ldots, C, \ldots, A_N$ indicates that the data package C is used in place of $A_E$ in a list of arguments for the function R.

39 Claims, 2 Drawing Sheets

U.S. PATENT DOCUMENTS

2010/0325515 A1* 12/2010 Lohmar et al. ............... 714/752

FOREIGN PATENT DOCUMENTS

| WO | 2004 110099 | | 12/2004 |
|---|---|---|---|
| WO | 2006133158 | A1 | 12/2006 |
| WO | 2007104308 | A1 | 9/2007 |

OTHER PUBLICATIONS

Haartsen, Jaap, Bluetooth—The universal radio interface for ad hoc, wireless connectivity. Ericsson Review No. 3, 1998, pp. 110-117.*
Zhou et al.; On Quality-of-Service and Energy Consumption Tradeoffs in FEC-Encoded Audio Streaming; Software Engineering and Network Systems Laboratory Department of Computer Science and Engineering; Michigan State University, Michigan 48824.
Shacham et al.; Packet Recovery in High-Speed Networks Using Coding and Buffer Management; Information and Telecommunication Sciences Center SRI International; Menlo Park, CA 94025.
Danish Search Report Dated Aug. 4, 2009 for Application No. PA 2008 01830.
International-Type Search Report dated Oct. 21, 2009 for PA 2008 01830.
English Abstract of JP2004159042.

* cited by examiner

ERROR CORRECTION SCHEME IN A HEARING SYSTEM WIRELESS NETWORK

RELATED APPLICATION DATA

This application claims priority to and the benefit of Danish Patent Application No. PA 2008 01830, filed Dec. 22, 2008, the entire disclosure of which is expressly incorporated by reference.

FIELD

The present application relates to a hearing instrument wireless network for wireless interconnection of hearing instruments with each other, and wireless interconnection of hearing instruments with other devices, such as remote controllers, fitting instruments, mobile phones, media players, headsets, door bells, alarm systems, broadcast systems, such as tele coil replacement, etc, etc.

BACKGROUND

WO 2004/110099 discloses a hearing aid wireless network with a communication protocol that is simple thereby requiring a small amount of code and power consumption during operation. Further, the acquisition time is low, and the latency is low.

Numerous schemes of correcting data transmission errors in noisy communication channels are known in the art. Typically, a number of bits is added to data bits in a data package according to a certain encoding scheme making it possible to detect a certain number of bit errors caused by noise in the communication channel and also correct a certain, typically smaller, number of bit errors in a de-coder. Some schemes include re-transmission of data packages. Error correction schemes increase the time needed for transmission and reception of a certain number of data bits, and wireless communication circuitry requires significant amounts of power during reception and transmission of data.

Typically, in a hearing instrument, such as a hearing aid, only a limited amount of power is available from the power supply. For example, in a hearing aid, power is typically supplied from a conventional $ZnO_2$ battery.

SUMMARY

Thus, in a hearing system, it is desirable to minimize the time transmitters and receivers are actively performing transmission and reception, respectively. For example, it is desirable to minimize re-transmission of data packets.

Accordingly, a hearing system is provided, comprising a hearing instrument having a receiver for wireless data communication between the hearing instrument and another device in a wireless network. The hearing instrument may further have a communication controller that is configured for controlling the wireless data communication.

In accordance with the present error correction scheme, a data package D containing B bits to be transmitted, is divided into a number N of data packages $A_1, A_2, \ldots, A_N$. Preferably, but not necessarily, data packages $A_1, A_2, \ldots, A_N$ contain identical number of bits B/N. In order to be able to detect and correct possible bit errors in one data package $A_I$ a further data package C is formed as a function of $A_1, A_2, \ldots, A_N$:

$$C = F(A_1, A_2, \ldots, A_N).$$

Then, the data packages $A_1, A_2, \ldots, A_N$, and C are transmitted wirelessly from a transmitting device in the wireless network.

In the hearing instrument or another device connected to the wireless network and for which the transmitted data packages are intended, the data receiver is activated, e.g. turned on, to perform data reception of data packages $A_1, A_2, \ldots, A_N$, and C. The data receiver also performs error detection and, in case of detection of error(s) in one of the data packages $A_1, A_2, \ldots, A_N$, namely $A_E$, data recovery is performed based on the remaining data packages $A_1, A_2, \ldots, A_N$, and C in accordance with:

$$A_E = R(A_1, A_2, \ldots, C, \ldots, A_N),$$

wherein $A_1, A_2, \ldots, C, \ldots, A_N$ indicates that data package C replaces the defective data package $A_E$ in the list of arguments of function R. $A_E$ may be any one of the data packages $A_1, A_2, \ldots, A_N$.

Thus, the function F is used to calculate redundant data information inserted into the transmitted data stream in accordance with specific algebraic relations so that the received data stream, in the event that errors have been introduced during data transmission, can be corrected using the corresponding reversed specific algebraic relations constituting the function R.

It should be noted that division of original data package D with B bits into a number of data packages $A_1, A_2, \ldots, A_N$, e.g. of the same size B/N, leads to the advantage that only one extra package C with a small number of bits, e.g. B/N, needs to be transmitted and received. Thus, the time the receiver needs to be activated in order to be able to perform data recovery is only increased by B/N.

Preferably, the communication controller is configured to control the receiver in such a way that reception of data package C takes place solely in case of detection of error(s) in data packages $A_1, A_2, \ldots, A_N$. Hereby further power consumption by the receiver is saved when no error(s) is detected, since reception of data package C is not performed in case of error free data transmission of $A_1, A_2, \ldots, A_N$.

An error in the received data stream may be detected using e.g. parity bits, Hamming code, checksum, cyclic redundancy check, etc.

Accordingly, a hearing system is provided comprising a hearing instrument having a receiver for wireless data communication between the hearing instrument and another device in a wireless network, and a communication controller that is configured for controlling the receiver for data reception of data packages $A_1, A_2, \ldots, A_N$, and C. The receiver is further configured for performing error detection, and in case of detection of an error in one of the data packages $A_1, A_2, \ldots, C, \ldots, A_N$, namely $A_E$, for recovering the data package $A_E$ in accordance with: $A_E = R(A_1, A_2, \ldots, C, \ldots, A_N)$, wherein $A_1, A_2, \ldots, C, \ldots, A_N$ indicates that data package C replaces defective data package $A_E$ in the list of arguments of function R.

Thus, in a device connected in the wireless network, a communication controller of the device may be configured for always performing data reception of data package C in addition to data reception of data packages $A_1, A_2, \ldots, A_N$ whether an error has been detected or not, for example in a device with plenty of power available. Still, data recovery may be performed solely in response to detection of an error in one, namely $A_E$, of the received data packages $A_1, A_2, \ldots, A_N$.

However, in a device with limited amount of power available, data reception of data package C may be performed solely in response to detection of an error in one of the received data packages $A_1, A_2, \ldots, A_N$.

According to the present error correction scheme, the transmitting device always transmits the extra data package C for possible subsequent error correction; however, typically the transmitting device is a device with a large power supply, such as a remote controller, a fitting instrument, a mobile phone, a media players a headset, a door bell, an alarm system, a broadcast system, etc. The transmitting device may also be a hearing instrument.

Function F and function R may be identical functions.

In one embodiment, F is an exclusive-or function so that $$C = A_1 \oplus A_2 \oplus \ldots \oplus A_N$$

and $$A_E = A_1 \oplus A_2 \oplus \ldots \oplus C \oplus \ldots \oplus A_N.$$

For example, N may be equal to 2 so that data package D containing B bits to be transmitted is divided into 2 data packages $A_1$ and $A_2$, each of which contains B/2 bits.

In order to be able to detect and correct possible bit errors in a data package, a further data package C is formed as a function of $A_1$ and $A_2$:

$$C = A_1 \oplus A_2.$$

Then, the data packages $A_1$ and $A_2$, and C are transmitted wirelessly from a transmitting device in the wireless network.

In the hearing instrument or another device connected to the wireless network and for which the transmitted data packages are intended, the data receiver is activated, e.g. turned on, to perform data reception of data packages $A_1$ and $A_2$ and C. The data receiver also performs error detection and, in case of detection of error(s) in $A_1$ or $A_2$, data recovery is performed based on:

$$A_1 = C \oplus A_2 \text{ or } A_2 = C \oplus A_1.$$

It should be noted that division of original data package D with B bits into two data packages $A_1$ and $A_2$ of the same size B/2 bits, leads to the advantage that only one extra package C with B/2 bits needs to be transmitted and received. Thus, the time the receiver needs to be activated in order to be able to perform data recovery is only increased by B/2.

Preferably, the communication controller is configured to control the receiver in such a way that reception of data package C takes place solely in case of detection of error(s) in data package $A_1$ or $A_2$. Hereby further power consumption by the receiver is saved when no error(s) is detected, since reception of data package C is not performed in case of error free data transmission of $A_1$ and $A_2$.

The limited power supply requirement of the provided error correction scheme makes it suitable for incorporation in a hearing instrument with limited power supply capabilities.

The hearing instrument may be a hearing aid, a tinnitus relieving device, a tinnitus therapy device, a noise suppression device, etc., or any combination of two or more of such devices.

The receiver and transmitter of the hearing instrument may be comprised in a radio chip, such as the Nordic Semiconductor radio chip "nRF24101". A radio chip of this type draws significant amounts of current both when it transmits and receives. A conventional $ZnO_2$ battery is only capable of supplying the required amount of current for a limited time period, typically 1 millisecond. Continued supply of the required amount of current leads to a lowered supply voltage below which digital signal processing circuitry will stop operating properly. Further, the $ZnO_2$ battery will require time to recover after having supplied current to the radio chip during communication. Typically, the radio chip duty cycle, i.e. the percentage of radio turn-on time with respect to the sum of the radio turn-on and radio turn-off time, must be kept below 10%.

In one embodiment, the receiver and communication controller operate according to a frequency diversification or spread spectrum scheme, i.e. the frequency range utilized by the wireless network is divided into a number of frequency channels, and data communication switch channels according to a predetermined scheme so that transmissions are distributed over the frequency range.

Preferably, a frequency hopping algorithm is provided that allows devices in the network to calculate what frequency channel the network will use at any given point in time without relying on the history of the network. For example, based on the present frequency channel number, a pseudo-random number generator calculates the next frequency channel number. This facilitates synchronization of a new device in the network, e.g. the new device comprises the same pseudo-random number generator as the devices already connected in the network. Thus, upon receipt of the current frequency channel number during acquisition, the new device will calculate the same next frequency channel number as the other devices in the network.

In a network operating according to a spread spectrum scheme, the communication has a low sensitivity to noise, since noise is typically present in specific frequency channels, and communication will only be performed in a specific frequency channel for a short time period after which communication is switched to another frequency channel.

Advantageously, each of the data packages $A_1, A_2, \ldots, A_N$ may be transmitted in an individual frequency channel, i.e. subsequent to the transmission of one data package $A_P$, a frequency hop is performed before transmission of the next data package $A_{P+1}$ of the data packages $A_1, A_2, \ldots, A_N$. As mentioned above, noise is typically present in specific frequency channels so that a typical transmission error of this transmission scheme generates data corruption of a single package of the data packages $A_1, A_2, \ldots, A_N$ while no errors are generated in the remaining data packages.

It is a further advantage of the hearing system operating according to a spread spectrum scheme that several networks may co-exist in close proximity, for example two or more hearing instrument users may be present in the same room without network interference, since the probability of two networks simultaneously using a specific frequency channel will be very low. Likewise, the hearing instrument network may coexist with other wireless networks utilizing the same frequency band, such as Bluetooth networks or other wireless local area networks. Hearing instruments according to some embodiments described herein may advantageously be incorporated into a binaural hearing aid system, wherein two hearing aids are interconnected through the wireless network for digital exchange of data, such as audio signals, signal processing parameters, control data, such as identification of signal processing programs, etc, etc, and optionally interconnected with other devices, such as a remote control, etc.

The receivers and transmitters of devices in the network may operate in accordance with a time-division-multiple-access (TDMA) frame structure, wherein time is divided into frames comprising a set of numbered time slots. Different devices in the network communicate in specific respective time slots. Thus, when connected in the network, the frames of the devices are synchronised.

Every device in the network has its own identification number, e.g. a 32-bit number. Globally unique identities are not required since the probability of two users having hearing instruments with identical identifications is negligible.

The hearing system may operate in the 2.4 GHz industrial scientific medical (ISM) band. The ISM band may for example be divided into 80 frequency channels of 1 MHz bandwidth. A frequency hopping TDM (Time Division Multiplex) scheme is preferred. During acquisition, the frequency hopping scheme may comprise a reduced number of frequency channels, e.g. less than 16 channels, preferably 4-8 channels, for faster acquisition. Channels of the reduced set of frequency channels are denoted acquisition channels. Preferably, the acquisition channels are distributed uniformly throughout the frequency band utilised by the network.

The duration of a time slot may for example be 1250 μs (twice the length of a minimum Bluetooth™ slot). The slots may be numbered from 0 to 255.

256 slots, i.e. slot 0 to slot 255, constitute a frame. Frames are also numbered.

Among factors influencing selection of the length of a slot, is the required lower latency of the system and a desired low overhead with respects to headers and PLL (Phase Locked Loop) locking. Preferably, the slot length is a multiple of 625 μs, facilitating (i.e. not prevent) that the protocol can be implemented on BLUETOOTH™ enabled devices.

Each slot (except slot 128) is used for transmission by one specific device so that data collisions inside the network are prevented. Any slave device may transmit data in slot 128 and hence collisions may occur in this slot. The master device transmits timing information in slot 0. The slot and frame counters of a slave device are synchronized with the respective counters of the master device of the network.

A device may use one or more slots for transmission of data. Slots may be allocated during manufacture of a given device, or, slots may be allocated dynamically during acquisition. Preferably, the allocation table is stored in the master device.

In order to lower power consumption in the hearing instrument, the hearing instrument receiver and transmitter are activated, i.e. allowed to operate for reception and transmission, respectively, e. g. turned on, only in their respective time slots. Further, the bit rate can be made scalable in such a system: When low bit transfer rates are required, the transceiver need only be active a small fraction of the time. In this way power can be saved.

In accordance with some embodiments, a method of wireless data communication between a hearing instrument and another device, includes dividing a data package D into N data packages $A_1, A_2, \ldots, A_N$, forming a data package C as a function of $A_1, A_2, \ldots, A_N$ in accordance with a relationship $C=F(A_1, A_2, \ldots, A_N)$, wirelessly transmitting the data packages $A_1, A_2, \ldots, A_N$, and wirelessly transmitting the data package C, wherein the data package C is for recovering $A_E$, one of the data packages $A_1, A_2, \ldots, A_N$ that contains an error, in accordance with a relationship $A_E=R(A_1, A_2, \ldots, C, \ldots, A_N)$, in which $A_1, A_2, \ldots, C, \ldots, A_N$ indicates that the data package C is used in place of $A_E$ in a list of arguments for the function R.

In accordance with other embodiments, a system for wireless data communication between a hearing instrument and another device includes means for dividing a data package D into N data packages $A_1, A_2, \ldots, A_N$, means for forming a data package C as a function of $A_1, A_2, \ldots, A_N$ in accordance with a relationship $C=F(A_1, A_2, \ldots, A_N)$, and means for wirelessly transmitting the data packages $A_1, A_2, \ldots, A_N$, and for wirelessly transmitting the data package C, wherein the data package C is for recovering $A_E$, one of the data packages $A_1, A_2, \ldots, A_N$ that contains an error, in accordance with a relationship $A_E=R(A_1, A_2, \ldots, C, \ldots, A_N)$, in which $A_1, A_2, \ldots, C, \ldots, A_N$ indicates that the data package C is used in place of $A_E$ in a list of arguments for the function R.

In accordance with other embodiments, a method of wireless data communication between a hearing instrument and another device, includes receiving N data packages $A_1, A_2, \ldots, A_N$, wherein the N data packages are obtained by dividing a data package D, receiving data package C, wherein the data package C is formed as a function of $A_1, A_2, \ldots, A_N$ in accordance with a relationship $C=F(A_1, A_2, \ldots, A_N)$, performing error detection, and recovering $A_E$, one of the data packages $A_1, A_2, \ldots, A_N$ that contains an error, in accordance with a relationship $A_E=R(A_1, A_2, \ldots, C, \ldots, A_N)$, in which $A_1, A_2, \ldots, C, \ldots, A_N$ indicates that the data package C is used in place of $A_E$ in a list of arguments for the function R.

In accordance with other embodiments, a system for wireless data communication between a hearing instrument and another device includes means for receiving N data packages $A_1, A_2, \ldots, A_N$, and data package C, wherein the N data packages are obtained by dividing a data package D, and wherein the data package C is formed as a function of $A_1, A_2, \ldots, A_N$ in accordance with a relationship $C=F(A_1, A_2, \ldots, A_N)$, means for performing error detection, and means for recovering $A_E$, one of the data packages $A_1, A_2, \ldots, A_N$ that contains an error, in accordance with a relationship $A_E=R(A_1, A_2, \ldots, C, \ldots, A_N)$, in which $A_1, A_2, \ldots, C, \ldots, A_N$ indicates that the data package C is used in place of $A_E$ in a list of arguments for the function R.

In accordance with other embodiments, a hearing system includes a hearing instrument having a receiver for wireless data communication with another device in a wireless network, and a communication controller that is configured for controlling the wireless data communication, wherein the other device is configured for transmission of data packages $A_1, A_2, \ldots, A_N$, C, the data package C being a function of $A_1, A_2, \ldots, A_N$ in accordance with a relationship $C=F(A_1, A_2, \ldots, A_N)$, and wherein the communication controller is configured for controlling the receiver for receiving the data packages $A_1, A_2, \ldots, A_N$, and C, performing error detection, and recovering $A_E$, one of the data packages $A_1, A_2, \ldots, A_N$ that contains an error, in accordance with a relationship $A_E=R(A_1, A_2, \ldots, C, \ldots, A_N)$, in which $A_1, A_2, \ldots, C, \ldots, A_N$ indicates that the data package C is used in place of $A_E$ in a list of arguments for the function R.

DESCRIPTION OF THE DRAWING FIGURES

The above and other features and advantages will become more apparent to those of ordinary skill in the art by describing in detail exemplary embodiments thereof with reference to the attached drawings in which.

DETAIL DESCRIPTION

Some of the embodiments will now be described more fully hereinafter with reference to the accompanying drawings. The claimed invention may, however, be embodied in different forms and should not be construed as limited to the embodiments set forth herein. Thus, the illustrated embodiments are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated. Like reference numerals refer to like elements throughout.

Figure 1:
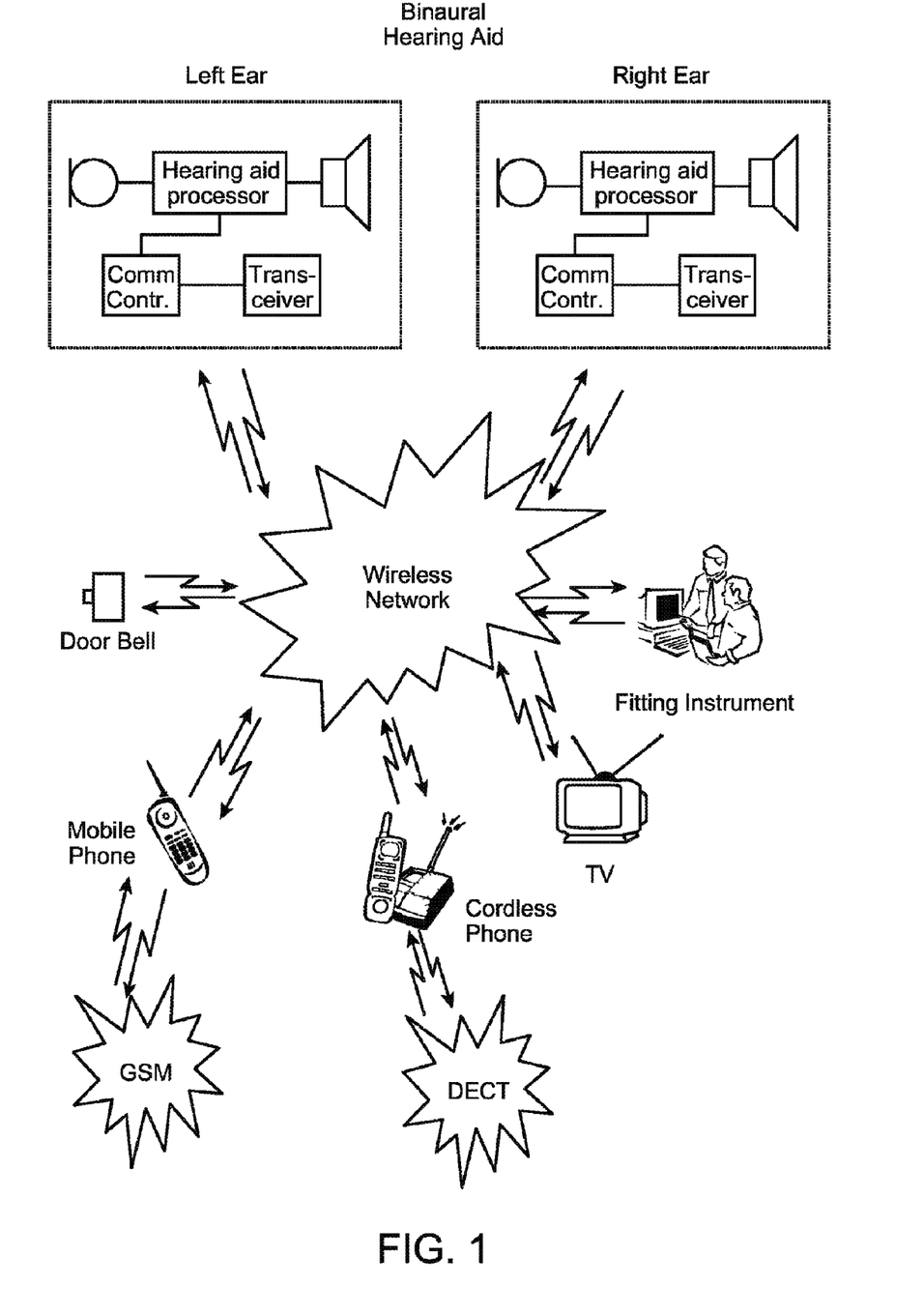
FIG. 1 schematically illustrates a hearing system wireless network.

FIG. 1 schematically illustrates a hearing system comprising a binaural hearing aid with a left ear hearing aid and a right ear hearing aid, each of which has a transceiver and communication controller for connection with a wireless network interconnecting the two hearing aids, and interconnecting the hearing aids and a plurality of other devices in the wireless network. In the example illustrated in FIG. 1, a doorbell, a mobile phone, a cordless phone, a TV-set, and a fitting instrument are also connected to the wireless network.

The illustrated embodiment operates in the 2.4 GHz industrial scientific medical (ISM) band. It comprises 80 frequency channels of 1 MHz bandwidth. The receivers and communication controllers of the shown devices operate according to a frequency diversification or spread spectrum scheme, i.e. the frequency range utilized by the network is divided into the 80 frequency channels, and transmissions switch channels according to a predetermined scheme so that transmissions are distributed over the ISM frequency range. A frequency hopping algorithm is provided that allows devices in the network to calculate what frequency channel the network will use at any given point in time without relying on the history of the network, e.g. based on the present frequency channel number, a pseudo-random number generator calculates the next frequency channel number. This facilitates synchronization of a new device in the network, e.g. the new device comprises the same pseudo-random number generator as the devices already connected in the network. Thus, upon receipt of the current frequency channel number during acquisition, the new device will calculate the same next frequency channel number as the other devices in the network. Preferably, one device in the network operates a master device of the network. Other devices in the system synchronize to the timing of the master device, and preferably, the master device is a hearing instrument, since the hearing instrument user will always carry the hearing instrument when he or she uses the network.

Communication in the illustrated network has low sensitivity to noise, since noise is typically present in specific frequency channels, and communication will only be performed in a specific frequency channel for a short time period after which communication is switched to another frequency channel.

A frequency hopping TDM scheme is utilized. During acquisition, the frequency hopping scheme comprises a reduced number of frequency channels, e.g. less than 16 channels, preferably 8 channels, for faster acquisition. Members of the reduced set of frequency channels are denoted acquisition channels. Preferably, the acquisition channels are distributed uniformly throughout the frequency band utilised by the network.

According to the time-division-multiple-access (TDMA) frame structure, the devices in the network transmit and receive data according to a coordinated time schedule wherein the time is divided into numbered time slots and different devices in the network communicate, e.g. receive data, in specific respective time slots. In order to lower power consumption in the hearing aid, the hearing aid receiver is turned on only in its time slot. Further, the bit rate can be made scalable in such a system: When low bit transfer rates are required, the receiver need only be active a small fraction of the time. In this way further power can be saved. A device may use one or more slots for transmission of data. Slots may be allocated during manufacture of a given device, or, slots may be allocated dynamically during acquisition. Preferably, the allocation table is stored in the master device.

In the illustrated hearing system, a data package D containing 32 bits to be transmitted is divided into 2 data packages $A_1$ and $A_2$, each of which contains 16 bits. In order to be able to detect and correct possible bit errors in a data package, a further data package C is formed as a function of $A_1$ and $A_2$:

$$C = A_1 \oplus A_2.$$

For example:
D=11100110000110100101001110110001
and thus:
$A_1$=1110011000011010
$A_2$=0101001110110001
whereby
C=1011010110101011.

Data recovery is now possible, since $A_1 = C \oplus A_2$ and $A_2 = C \oplus A_1$:
$A_2$=0101001110110001
C=1011010110101011
$A_1$=1110011000011010
and
$A_1$=1110011000011010
C=1011010110101011.
$A_2$=0101001110110001

In the hearing instrument or another device connected to the wireless network and for which the transmitted data packages are intended, the data receiver is activated, e.g. turned on, to perform data reception of transmitted data packages $A_1$ and $A_2$ and C:
11100110000110100101001110110001 1011010110101011.

The data receiver also performs error detection and in case of detection of error(s) in $A_1$ or $A_2$, data recovery is performed based on:

$$A_1 = C \oplus A_2 \text{ or } A_2 = C \oplus A_1.$$

Thus, if $A_1$ is corrupted, $A_1$ is recovered by performing the exclusive-or operation on C and $A_2$. Correspondingly, if $A_2$ is corrupted, $A_2$ is recovered by performing the exclusive-or operation on C and $A_1$.

It should be noted that division of original data package D with 32 bits into two data packages $A_1$ and $A_2$ of 16 bits, leads to the advantage that only one extra package C with 16 bits needs to be transmitted and received. Thus, the time the receiver needs to be activated in order to be able to perform data recovery is only increased by 16 bits transmission time. Division of original data package D into more than two data packages $A_i$ further reduces the extra time the receiver needs to be activated in order to be able to perform data recovery.

Preferably, the communication controller is configured to control the receiver in such a way that reception of data package C takes place solely in case of detection of error(s) in data package $A_1$ or $A_2$. Hereby further power consumption by the receiver is saved, since the receiver is only active during reception of data packages $A_1$ and $A_2$ unless an error is detected during transmission of $A_1$ and $A_2$.

Figure 2:
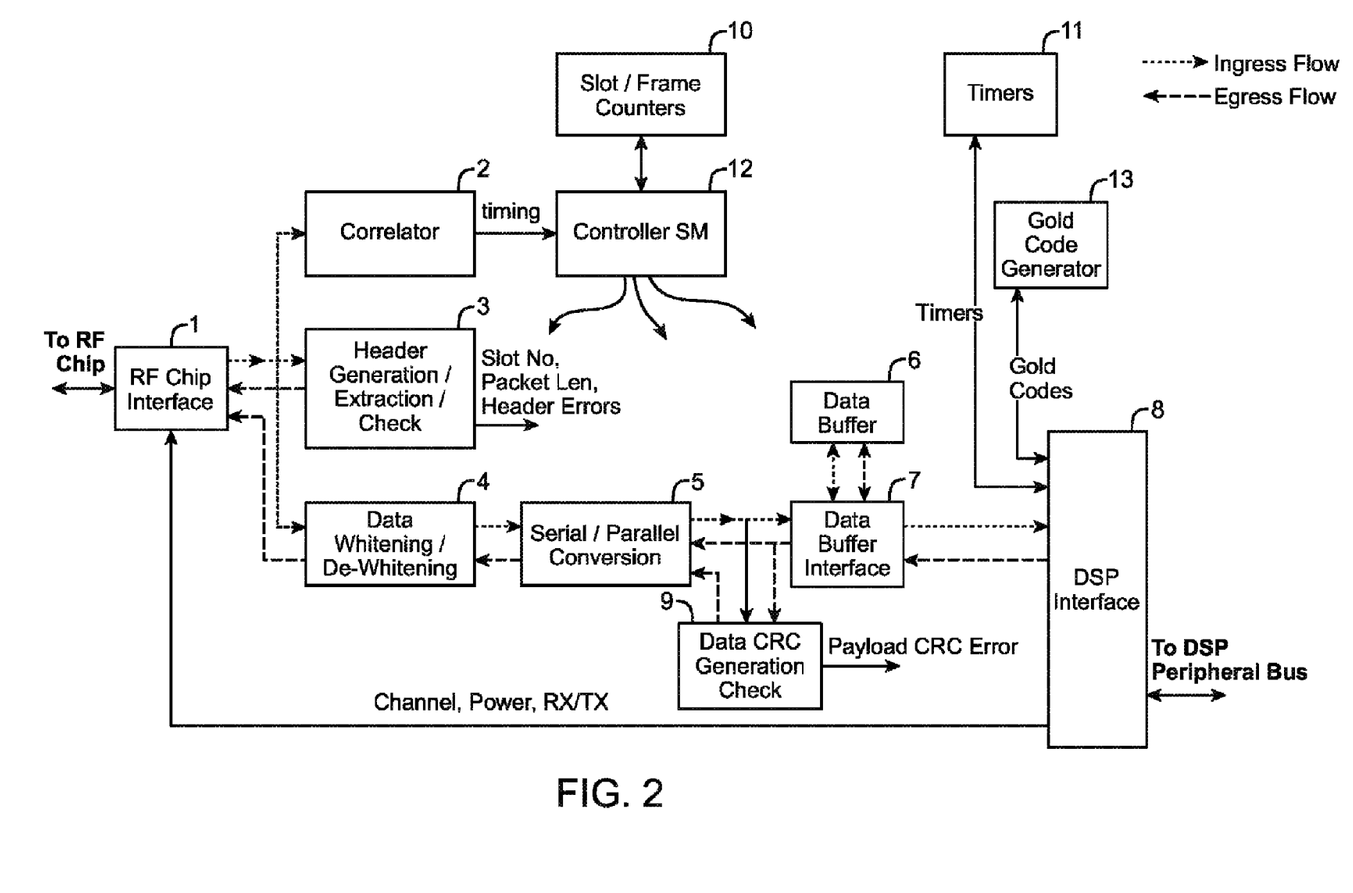
FIG. 2 is a blocked schematic of a transceiver and communication controller according to some embodiments.

FIG. 2 is a blocked schematic of a transceiver and communication controller according to some embodiments. FIG. 2 also illustrates the major data flow into and out of the units. The RF chip interface receives a data stream from the RF chip.

The correlator 2 extracts the slot and frame timing from the sync word, so that the rest of the receive chain can be synchronized. Based on this timing, the header extraction block 3 analyses the package header and extracts the slot number and package length. Any errors in the header are reported. The data de-whitening block 4 de-whitens the package data. The data is then converted to 16 bits parallel by the serial-parallel conversion block 5. The package data is stored in an internal data buffer 6 by the data buffer interface 7. The data is then accessible to the DSP via the DSP interface 8 through the peripheral bus. A CRC (Cyclic Redundancy Check) check 9 can also be performed on the package data. All internal configuration registers and results of header checks, CRC errors etc are accessible though the DSP interface. Slot and frame counters 10 are also provided as well as a number of hardware timers 11.

The controller state machine 12 is responsible for overall timing of the base-band engine.

At transmission, the RF chip interface 1 sends SPI commands to the RF chip for configuration.

The DSP writes a package of data to the data buffer 6, 7 via the DSP interface 8. The package data has a CRC calculated via the data CRC generation block 9. The combined data payload and CRC are then converted to serial 5 and whitened 4. The package header is constructed by the header generation block 3 and then appended to the data. The completed package is then streamed to the RF chip by the RF chip interface 1.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The claimed inventions are intended to cover alternatives, modifications, and equivalents.

The invention claimed is:

1. A method of wireless data communication between a hearing instrument and another device, comprising:
    dividing a data package D into N data packages A1, A2, ..., AN;
    forming a data package C as a function of A1 A2, ..., AN in accordance with a relationship C=F (A1, A2, ..., AN), the data package C is formed to recover AE, one of the data packages A1, A2, ..., AN that contains an error, in accordance with a relationship AE=R(A1, A2, ..., C, ..., AN), in which A1, A2, ..., C, ..., AN indicates that the data package C is used in place Of AE in a list of arguments for the function R;
    wirelessly transmitting the data packages A1, A2, ..., AN; and
    wirelessly transmitting the data package C in response to a detection of the error;
    wherein the act of wirelessly transmitting the data package C is performed by the other device for reception by the hearing instrument in response to the detection of the error by the hearing instrument,
    wherein the hearing instrument is configured to activate in a time slot that is variable in accordance with a variable bit rate.

2. The method according to claim 1, wherein the function F and the function R are identical.

3. The method according to claim 2, wherein the function F is an exclusive-or function so that $$C = A_1 \oplus A_2 \oplus \ldots \oplus A_N$$

and $$A_E = A_1 \oplus A_2 \oplus \ldots \oplus C \oplus \ldots \oplus A_N.$$

4. The method according to claim 3, wherein N is equal to 2 so that $$C = A_1 \oplus A_2$$

and $$A_1 = C \oplus A_2 \text{ and } A_2 = A_1 \oplus C.$$

5. The method according to claim 1, wherein at least some of the packages $A_i$, C are wirelessly transmitted in respective different frequency channels.

6. The method of claim 1, wherein the error is due to noise in a communication channel.

7. The method of claim 1, wherein the act of wirelessly transmitting the data package C in response to the detection of the error provides power saving for the hearing instrument that receives the data package C.

8. A system for wireless data communication between a hearing instrument and another device, comprising:
    means for dividing a data package D into N data packages $A_1, A_2, \ldots, A_N$;
    means for forming a data package C as a function of $A_1, A_2, \ldots, A_N$ in accordance with a relationship C=F ($A_1, A_2, \ldots, A_N$); and
    means for wirelessly transmitting the data packages $A_1, A_2, \ldots, A_N$, and for wirelessly transmitting the data package C in response to a detection of an error;
    wherein the data package C is for recovering $A_E$, one of the data packages $A_1, A_2, \ldots, A_N$ that contains the error, in accordance with a relationship $A_E$=R(A1, $A_2, \ldots, C, , A_N$), in which $A_1, A_2, \ldots, C, \ldots, A_N$ indicates that the data package C is used in place of $A_E$ in a list of arguments for the function R; and
    wherein the means for wirelessly transmitting the data package C in response to the detection of the error is a component of the other device, and the error is detected by the hearing instrument.

9. A method of wireless data communication between a hearing instrument and another device, comprising:
    receiving N data packages A1, A2, ..., AN, wherein the N data packages are parts of a data package D;
    receiving data package C, wherein the data package C is formed as a function of A1, A2, ..., AN in accordance with a relationship C=F (A1, A2, ..., AN);
    performing error detection; and
    recovering AE, one of the data packages A1, A2, ..., AN that contains an error, in accordance with a relationship AE=R(A1, A2, ..., C, ..., AN), in which A1, A2, ..., C, ..., AN indicates that the data package C is used in place of AE in a list of arguments for the function R;
    wherein the act of receiving the data package C is performed in response to the detection of the error, and wherein both the act of receiving the data package C and the act of performing the error detection are performed by the hearing instrument,
    wherein the act of receiving the data package C is performed by a receiver at the hearing instrument, the receiver configured to activate in a time slot that is variable in accordance with a variable bit rate.

10. The method according to claim 9, wherein the function F and the function R are identical.

11. The method according to claim 10, wherein the function F is an exclusive-or function so that $$C = A_1 \oplus A_2 \oplus \ldots \oplus A_N$$

and $$A_E = A_1 \oplus A_2 \oplus \ldots \oplus C \oplus \ldots \oplus A_N.$$

12. The method according to claim 11, wherein N is equal to 2 so that $$C = A_1 \oplus A_2$$

and $$A_1 = C \oplus A_2 \text{ and } A_2 = A_1 \oplus C.$$

13. The method according to claim 9, wherein at least some of the packages $A_i$, C are received in respective different frequency channels.

14. The method of claim 9, wherein the error is due to noise in a communication channel.

15. The method of claim 9, wherein the error detection is performed on each of the received N data packages.

16. The method of claim 9, wherein the act of receiving the data package C in response to the detection of the error provides power saving for the hearing instrument that receives the data package C.

17. The method of claim 9, wherein the other device is carried by a user of the hearing instrument, and the hearing instrument and the other device are configured to communicate with each other through a Bluetooth network.

18. A system for wireless data communication between a hearing instrument and another device, comprising:
means for receiving N data packages A1, A2, ..., AN, and data package C, wherein the N data packages are parts of a data package D, and wherein the data package C is formed as a function of A1, A2, ..., AN in accordance with a relationship C=F (A1, A2, ..., AN);
means for performing error detection; and
means for recovering AE, one of the data packages A1, A2, ..., AN that contains an error, in accordance with a relationship AE=R(A1, A2, ..., C, ..., AN), in which A1, A2, ..., C, ..., AN indicates that the data package C is used in place Of AE in a list of arguments for the function R;
wherein the means for receiving receives the data package C in response to the detection of the error, and wherein both the means for receiving and the means for performing error detection are parts of the hearing instrument,
wherein the means for receiving comprises a receiver configured to activate in a time slot that is variable in accordance with a variable bit rate.

19. The system of claim 18, wherein the other device is configured for being carried by a user of the hearing instrument, and the hearing instrument and the other device are configured to communicate with each other through a Bluetooth network.

20. A hearing system comprising:
a hearing instrument having a receiver for wireless data communication with another device in a wireless network, and a communication controller that is configured for controlling the wireless data communication;
wherein the other device is configured for dividing data package D into N data packages A1, A2, ..., AN, and for transmission of the data packages A1, A2, ..., AN, and a data package C, the data package C being a function of A1, A2, ..., AN in accordance with a relationship C=F (A1, A2, ..., AN);
wherein the communication controller controls the receiver for: receiving the data packages A1, A2, ..., AN, and C, and recovering AE, one of the data packages A1, A2, ..., AN that contains an error, in accordance with a relationship AE=R(A1, A2, ..., C, ..., AN), in which A1, A2, ..., C, ..., AN indicates that the data package C is used in place Of AE in a list of arguments for the function R; and
wherein the communication controller of the hearing instrument controls the receiver for receiving the data package C in response to a detection of an error by the hearing instrument,
wherein the receiver is configured to activate in a time slot that is variable in accordance with a variable bit rate.

21. The hearing system according to claim 20, wherein the function F and the function R are identical.

22. The hearing system according to claim 21, wherein the function F is an exclusive-or function so that $$C = A_1 \oplus A_2 \oplus \ldots \oplus A_N$$

and $$A_E = A_1 \oplus A_2 \oplus \ldots \oplus C \oplus \ldots \oplus A_N.$$

23. The hearing system according to claim 22, wherein N is equal to 2 so that $$C = A_1 \oplus A_2$$

and $$A_1 = C \oplus A_2 \text{ and } A_2 = A_1 \oplus C.$$

24. The hearing system according to claim 20 wherein the other device is configured for transmission of at least some of the data packages $A_i$, C in respective different frequency channels.

25. The hearing system according to claim 20, wherein the hearing instrument further comprises a transmitter, and wherein the communication controller is further configured for controlling the transmitter to transmit data packages $A_1'$, $A_2'$, ..., $A_N'$, C', wherein the data package C' is a function of $A_1'$, $A_2'$, ..., $A_N'$ in accordance with a relationship C'=F ($A_1'$, $A_2'$, ..., $A_N'$).

26. The hearing system of claim 20, wherein the error is due to noise in a communication channel.

27. The hearing system of claim 20, wherein the communication controller is configured for controlling the receiver for performing error detection on each of the received N data packages.

28. The haring system of claim 20, wherein the communication controller is configured for controlling the receiver for receiving the data package C in response to the detection of the error to provide power saving for the receiver.

29. The hearing system of claim 20, wherein the hearing instrument is configured to communicate with the other device through a Bluetooth network.

30. A hearing system comprising:
a hearing instrument having a receiver for wireless data communication with another device in a wireless network, and
a communication controller that is configured for controlling the wireless data communication;
wherein the other device is configured for dividing data package D into N data packages A1, A2, ..., AN, and for transmission of the data packages A1, A2, ..., AN, and a data package C, the data package C being a function of A1, A2, ..., AN in accordance with a relationship C=F (A1, A2, ..., AN);
wherein the communication controller controls the receiver for: receiving the data packages A1, A2, ..., AN, and C, and recovering AE, one of the data packages A1, A2, ..., AN that contains an error, in accordance with a relationship AE=R(A1, A2, ..., C, ..., AN), in which A1, A2, ..., C, ..., AN indicates that the data package C is used in place Of AE in a list of arguments for the function R;

wherein the communication controller of the hearing instrument controls the receiver for receiving the data package C in response to a detection of an error by the hearing instrument; and wherein the other device is configured for data transmission in accordance with a frequency hopping scheme, in which subsequent to the transmission of one data package $A_{p+1}$ of the data packages $A1, A2, \ldots, AN$, a frequency hop is performed before the transmission of the next data package $A_p$ of the data packages $A1, A2, \ldots, AN$, so that each of the data packages $A1, A2, \ldots, AN$ is transmitted in an individual frequency channel, wherein the receiver is configured to activate in a time slot that is variable in accordance with a variable bit rate.

31. A method of wireless data communication between a first device and a second device, the first device being a hearing instrument, comprising:

receiving a plurality of data packages by the hearing instrument; and performing detection of an error by the hearing instrument;

wherein when the hearing instrument detects the error, receiving a data correction package transmitted from the second device to the hearing instrument, wherein the data correction package is based at least on some of the data packages; and recovering one of the data packages that contains the error using the data correction package; and wherein the hearing instrument comprises a controller for controlling a receiver that performs the act of receiving the data correction package in response to the detected error, wherein the receiver is configured to activate in a time slot that is variable in accordance with a variable bit rate.

32. The method of claim 31, wherein the hearing instrument comprises a first hearing aid.

33. The method of claim 32, wherein the second device comprises a second hearing aid.

34. the method of claim 31, wherein the data correction package is received by the first device through a Bluetooth network.

35. A hearing instrument, comprising:

a receiver for receiving a plurality of data packages; and a controller that controls the receiver to receive a data correction package transmitted by a device in response to a detection of an error by the hearing instrument, the controller being a part of the hearing instrument;

wherein the data correction package is based at least on some of the data packages, and is for recovering one of the data packages that contains the error, wherein the receiver is configured to activate in a time slot that is variable in accordance with a variable bit rate.

36. A hearing system comprising the hearing instrument of claim 35, and an additional hearing instrument.

37. The hearing system of claim 36, wherein the additional hearing instrument is configured to transmit the data correction package in response to the detection of the error by the hearing instrument.

38. The hearing system of claim 36, wherein the first hearing instrument comprises a first hearing aid, and the second hearing instrument comprises a second hearing aid.

39. The hearing system of claim 35, wherein the receiver is configured to receive the data correction package through a Bluetooth network.

* * * * *